United States Patent [19]
Collura

[11] 3,710,111
[45] Jan. 9, 1973

[54] DYNAMICALLY CALIBRATED OIL CONTENT METER

[75] Inventor: Lawrence Collura, Bethpage, N.Y.

[73] Assignees: Edward Dreyfus, Clark; Lawrence Collura, Bethpage, N.Y.

[22] Filed: Dec. 28, 1970

[21] Appl. No.: 101,860

[52] U.S. Cl.......250/83.3 UV, 250/43.5 R, 250/71 G
[51] Int. Cl..............................................G01n 21/26
[58] Field of Search....250/71 R, 71 G, 83.3 UV, 43.5 R

[56] References Cited

UNITED STATES PATENTS 3,581,085  5/1971  Barrett............................250/71 G X
2,936,371  5/1960  White et al................250/83.3 UV X Primary Examiner—Archie R. Borchelt
Attorney—Edward Dreyfus

[57] ABSTRACT

A system to continuously detect oil concentration levels in water flowing through a pipe having a transparent shunt path illuminated by an ultraviolet light source and a photo-cell detector responsive to light irradiation intensities therefrom. A second shunt path and small pump are provided about the first shunt path enabling the system to be zero balanced for ambient conditions of the principal liquid and alarm tripping calibrated under dynamic conditions for a predetermined concentration level therein.

4 Claims, 4 Drawing Figures

SYSTEM SCHEMATIC DIAGRAM

INVENTOR.
LAWRENCE COLLURA

DYNAMICALLY CALIBRATED OIL CONTENT METER

BACKGROUND OF THE INVENTION

The present invention relates to the continuous detecting, recording and indicating of contaminant levels in a liquid medium moving through a flow pipe and more particularly to the detection of oil suspension levels in discharge water.

The present practice to ballast oil tankers and other types of vessels for ocean crossings is to fill one or more cargo or reserve fuel oil tanks with ballast sea water after the tanks have been cleaned and dumped at sea. This ballast sea water is discharged at the harbor following crossing in preparation of taking on additional cargo. Although the discharged ballast water is presumably clean, it is known that varying amounts of residual oil contaminants are discharged therewith which contaminants contribute to pollution of the harbor waters and adjacent seashore facilities. Various state and federal regulations exist making unlawful this type of oil discharge, however, at present no effective means are available to detect the contaminant levels in the discharged ballast water and regulatory bodies often must resort to subjective and unreliable visual inspection of the water surfaces surrounding the vessel.

Furthermore, the vessel operator has no suitable way to determine to his own satisfaction that the oil suspensions is below acceptable limits during discharge. One available but commercially impractical and technically unreliable method is to conduct manually a periodic sample analysis and stop pumping as soon as the sample becomes unacceptable.

Consequently, the need exists for an arrangement to continuously detect oil to water ratios in a discharge pipe, record the results for evidentiary purposes, and have the ability of triggering an alarm or operating pump shut-off controls whenever unacceptable ratios are detected.

It is known that devices are commercially available that detect contaminant suspension in boiler feed water by imparting fluorescent light to a viewing chamber through which a portion of the feed water is passed before being fed to waste. The intensity of fluorescent light detected by a photo-cell at the chamber is related to the contaminant — water ratio. Although this principle may be applied to the ballast discharge detection, several serious problems remain to be solved. For example, the boiler feed water is quite pure and the variations of the fluorescent properties of the contaminants is not unduly great relative to the designed levels of detection. On the other hand, sea water as well as the cargo fluorescent properties vary greatly which problem must be solved in the equipment design if the detection results are to have any reliable meaning.

It is an object of this invention to provide a detector of the type described that can be easily and quickly calibrated regardless of the fluorescent properties of the principal medium and the suspended oil contaminants. It is a further important object of the invention to provide a detector arrangement that provides calibration under dynamic conditions which are similar to the dynamic conditions prevailing when the equipment is operating.

A further object of the invention is to provide an automatic shut-off arrangement taking the detector out of the discharge flow while the discharge pipe carries cargo so as to avoid fouling the viewing chamber.

A still further object of the invention is to provide a semi-automatic calibrating arrangement for each of a plurality of detecting stations which apply respective detection signals to a central control panel fitted with a plurality of recording channels, calibrating controls, and alarm tripping device.

SUMMARY

These and other objects of the invention are attained by the present invention which includes a by-pass flow pipe shunting a portion of the main discharge pipe, said by-pass path fitted with a transparent section of piping. This shunt section is preferably located downstream of the pump so that the suspended contaminant is more evenly distributed throughout the principal liquid medium in the discharge pipe and therefore equally represented in the shunt pipe. In one preferred embodiment, an ultraviolet light source illuminates the flow through the transparent section and a photo-cell detector senses the degree of light irradiation or light attenuation resulting therefrom. An electronic detector circuit is provided at a central control panel which in response to the photo-cell output signals controls a recording device and a signal level detector which in turn operates an alarm or pump shut-off control whenever unacceptable ratios are detected. In accordance with an important aspect of the invention a second shunt path is coupled to the first shunt path and is provided with a small pump to circulate a known volumn of principal liquid and known contaminant level through the transparent section for calibrating the electronic circuitry at the central control panel. A pair of electrically operated three-way control valves serve to (1) isolate both shunt paths from the discharge pipe during cargo discharge, (2) connect the first and second shunt paths for calibration; (3) connect the first path in shunt with the discharge pipe for normal operation. The central control panel is preferably provided with a plurality of channels each of which has independent calibrating and recording capability and each of which operates in response to a separate fluorescent detection arrangement as described.

DESCRIPTION OF FIGURES

Other and further features of the invention will become apparent from the following detailed description when taken in view of the appended drawing wherein.

DETAILED DESCRIPTION

Figure 1:
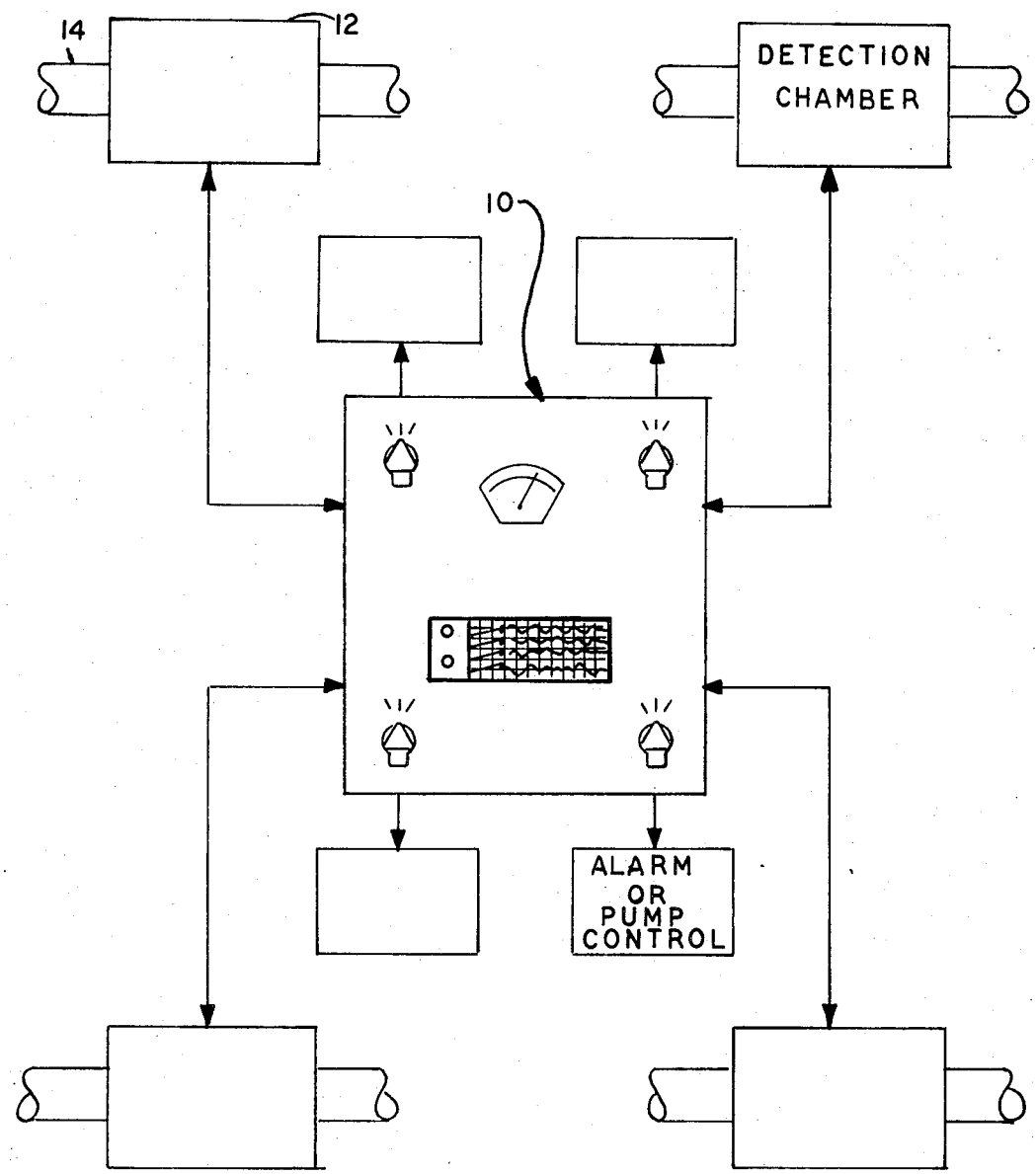
FIG. 1 is a schematic representation of the system according to the invention.
Figure 2:
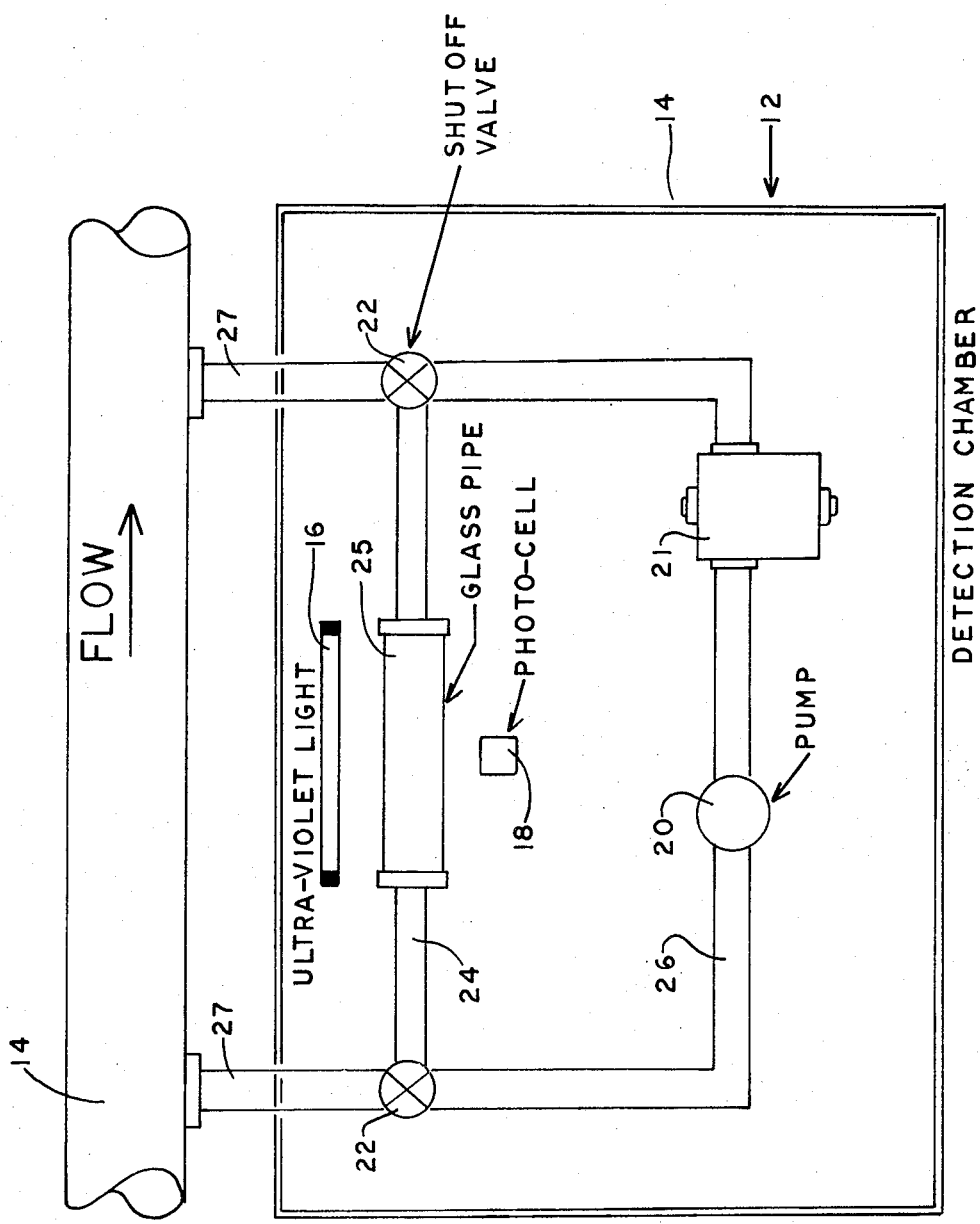
FIG. 2 is a schematic representation of a detecting station according to the present invention.

With reference to FIG. 1, a detection system according to one preferred embodiment of the invention includes a central control panel 10, operationally coupled one or more detection stations 12 each physically located at a separate discharge pipe 14 which in this example is a tanker discharge pipe. It will be understood, however, that the pipe 14 can have any desired utility not limited to vessels, etc. The number of stations 12 depends upon the number of discharge pipes to be monitored. Each station 12 includes an accessible casing 14 housing an ultraviolet light source 16, a photo-conductive cell 18 a circulating pump 20, a pair of electrically operated three-way valves 22, and piping 24 and 26 defining a pair of paths shunting a section of pipe 14 and communicating therewith through valves 22 and pipes 27. The diameters of pipes 14 and 24 may be in the ratio of 4:1 (e.g. 16 inches to 4 inches) while the ratio of pipes 24 and 26 may be in the ratio of 1:1. Reservoir 21 with removable sealed top and valved bottom drain is located in pipe 26 to permit access to pipes 26 and 24 for filling with liquid and contaminants as described below. The valves 22 prevent cargo, normally discharged through pipe 14 from being shunted through the detection station when not in use. Valves 22 also allow a sample of the ballast water to be continuously circulated in a closed loop through the viewing window during system calibration as described below. Pipe 24 is provided with a transparent glass section 25 arranged to intercept light from source 16 and permit any resulting irradiation differences therein to be detected by photo-cell 18. The diameter of section 25 is slightly greater than that of pipe 24 to provide some turbulent flow in section 25. For low contaminant level detection, light concentrating lenses may be provided to collect the detected light into the photo-cell 18. Glass section 25 is preferably removable to permit cleaning when the system is not in use. If desired light filtering devices (not shown) may be employed to reduce the visible light eminating from light 16 toward section 25 but pass the desired ultraviolet light. All operating components are electrically connected to and controlled from the central panel 10 via electrical conductors (not shown). The central control panel 10 provides centralized control and monitoring for the system. The panel houses the circuits to power, monitor and control each detection station. Selector and control switches, indicating lights and pen recorder are excessible on the front face of the panel. The quantity and configuration depends on the number of detection stations to be monitored and controlled.

Figure 3:
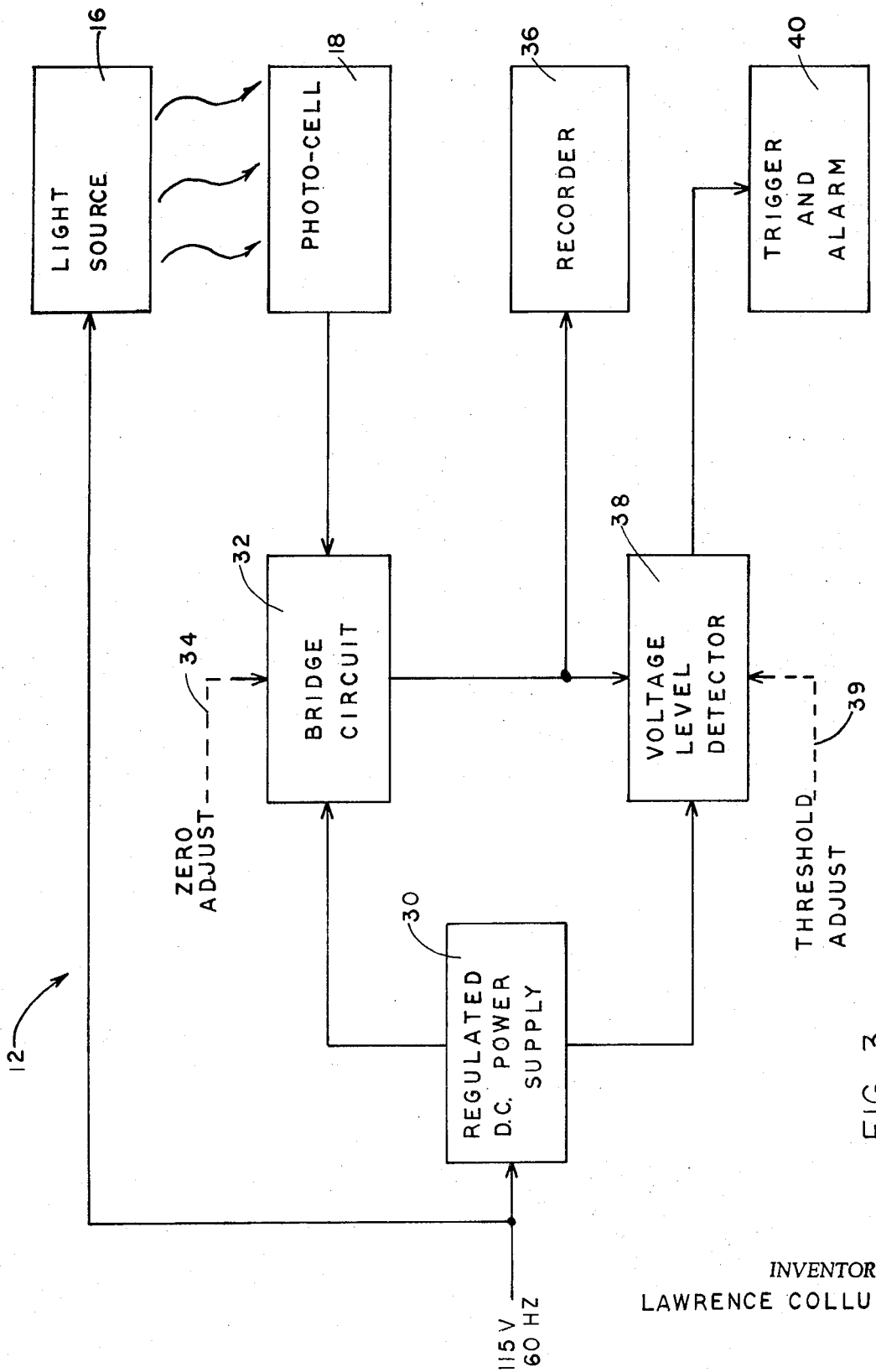
FIG. 3 is an operational block diagram of one channel of the system.
Figure 4:
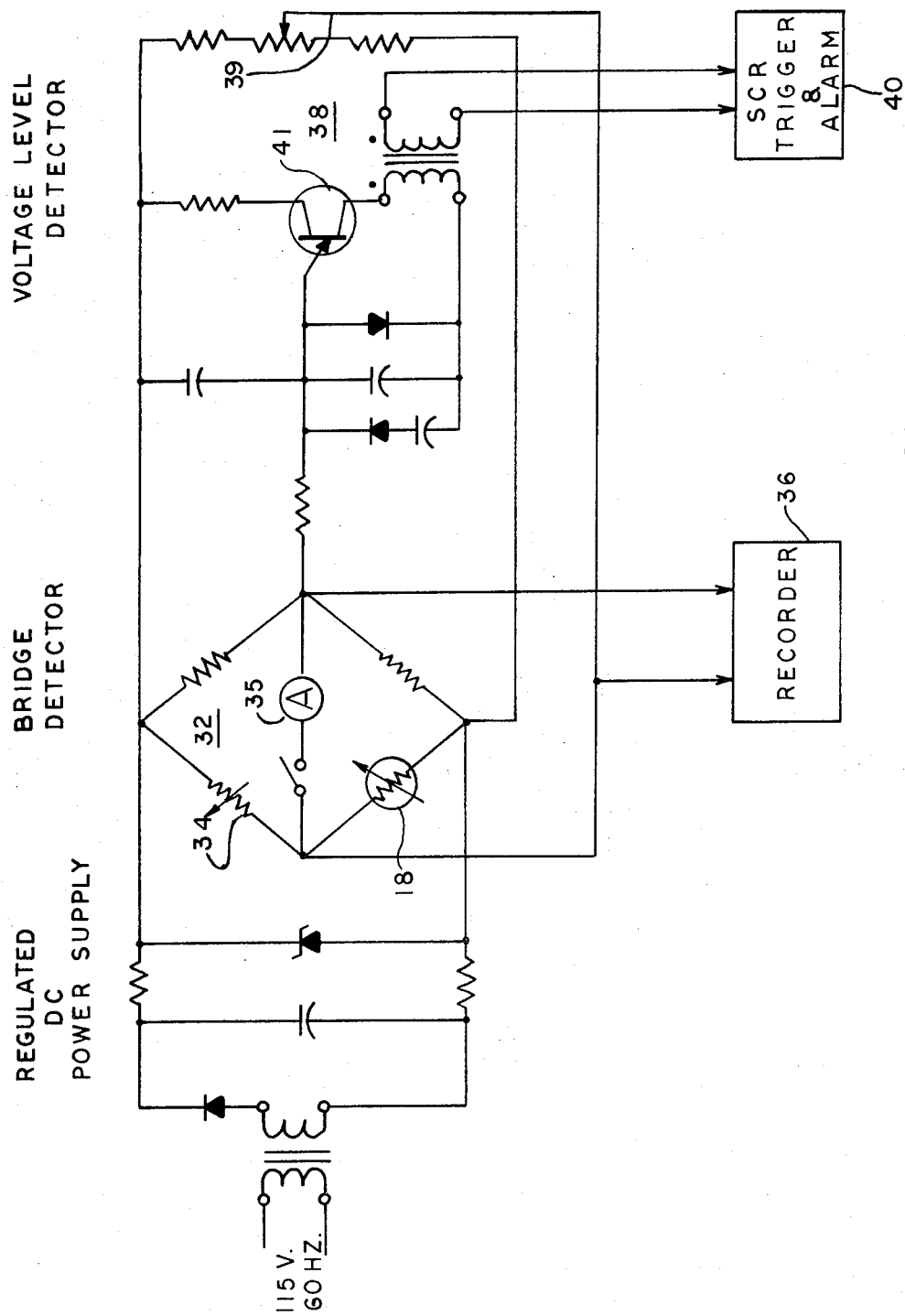
FIG. 4 is a circuit diagram of one example of the power and detector circuitry of FIG. 3.

With reference to FIGS. 3 and 4, one preferable example of the control panel electronic circuitry is disclosed which includes a regulated DC power supply 30 providing power to a balanced bridge detector 32 with a zero adjust or calibration device 34. Photo-cell 18 supplies control signals (variable resistance) to bridge 32 in response to light intensity levels received which are related to corresponding contaminant levels after calibration. Lead resistance from the photo-cell to the control panel is taken into account in the design of the bridge component values. The bridge output supplies input signals to the panel recorder 36 and a low voltage level detector stage 38 which in turn operates an SCR trigger circuit controlling the pump and/or alarm 40. The detector stage 38 is set by adjusting potentiometer 39 until the unijunction transistor 41 switches when photo-cell 18 is indicative of the known contamination limit as described below. When the unijunction transistor fires, pulses of sufficient magnitude are produced at the output to trigger an SCR or similar device to drive an alarm or pump shut-off control. These pulses continue to occur as long as the input signal from the bridge to the voltage detector state remains positive.

No circuit calibration adjustments on a dynamic basis need be made for temperature since this may be considered a constant parameter during any one pumping operation.

OPERATION

Before starting of the ballast water pumping operation, a sample of uncontaminated ballast water (which may have been separately preserved from the time ballast was taken on) is fed into reservoir 21 to fill the closed path including pipes 24 and 26. A reading is taken to obtain a measurement of ambient light level of the principal uncontaminated liquid medium. At the control panel 10, the photo-cell 18 resistance is displayed on a micro-ammeter. Adjustable control potentiometer 34 and the ammeter 35 are used to zero balance the detection circuits, that is, potentiometer 34 is adjusted until ammeter 35 reads zero indicating the potentiometer resistance equals the photo-cell resistance. A known volume of cargo contaminant equal to the desired tripping limit is then introduced through reservoir 21 into the water pipes 24 and 26, the volume of which is also known. For example, to detect and trip at a level of 5 ppm by volume, the amount of contaminant added to reservoir 21 would be 0.02 cc per 4 liters of water within the path of pipes 24 and 26. This contaminated sample is then circulated by pump 20 to obtain a second photo-cell resistance reading for the percent concentration level to be detected. In the voltage level detector stage 38, potentiometer 39 is adjusted to operate unijunction transistor switch 41 for this condition. The detection station and circuit are now calibrated. Pump 20 is stopped, and reservoir 21 is drained to empty pipes 24 and 26. Valves 22 are now operated to define the shunt path through pipes 27 and pipe 24. Principal pumping through pipe 14 can now begin and if the threshold level in the detector circuit is exceeded, the alarm is tripped and the discharge pumps may be stopped. Indicating lights on the panel will signal which specific discharge pipe is faulted. Furthermore, a continuous recording for each discharge pipe showing the history of contamination levels is available at the recorder as a permanent record.

It should be understood that the system according to the invention is not limited to use on board vessels only but may be used at on-shore and inland facilities having a need to monitor contaminate levels in liquids. The custom calibrating techniques according to the invention provides a wide spectrum of contaminates and concentration levels that can be detected.

I claim:

1. A system for detecting suspensed contaminant levels in a principal liquid flowing in a pipe comprising a first shunt path fitted with a transparent section communicating with the pipe to pass therethrough a portion of the flow, light eminating and detecting means arranged to illuminate the flow in the transparent section and develop electrical responses indicative of the contaminant concentration level therein, circuit means responsive to said electrical responses for indicating the instantaneous contaminant concentration level, the improvement comprising means defining a second shunt path closing about said transparent section and having means enabling custom ambient non-contaminated and predetermined contaminant concentration level calibration adjustments to be set into said circuit means, and wherein said means defining the first and second shunt paths includes a pump for circulating the liquid in the second shunt path and the transparent section to provide said concentration level calibration under dynamic conditions.

2. The system of claim 1 wherein means are provided to selectively (a) isolate both the shunt paths from the pipe (b) communicate the first shunt path with the pipe and isolate the second shunt path and (c) isolate the first and second shunt paths from the pipe and communicate the first and second shunt paths with each other.

3. The system of claim 1 wherein the first shunt path communicates with the pipe to reintroduce liquid passing therethrough back into the pipe.

4. The system of claim 1 wherein the circuit means includes a first detector stage having an adjustable zero set for principal liquid ambient conditions in said transparent section, the photo-cell applying signal input to said first stage, the first stage output feeding a second detector stage having a switch device responsive to a tripping signal level previously set in response to the predetermined concentration level in the transparent section during the calibration thereof.

* * * * *